(12) United States Patent
Flacks et al.

(10) Patent No.: US 6,587,941 B1
(45) Date of Patent: Jul. 1, 2003

(54) PROCESSOR WITH IMPROVED HISTORY FILE MECHANISM FOR RESTORING PROCESSOR STATE AFTER AN EXCEPTION

(75) Inventors: Brian King Flacks, Georgetown, TX (US); Harm Peter Hofstee, Austin, TX (US); Osamu Takahashi, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/498,089

(22) Filed: Feb. 4, 2000

(51) Int. Cl.[7] .................................................. G06F 9/30
(52) U.S. Cl. ...................... 712/218; 712/228; 712/244; 714/15; 714/16
(58) Field of Search ................................ 712/218, 244, 712/228; 714/15, 16, 17

(56) References Cited

U.S. PATENT DOCUMENTS 5,581,775 A * 12/1996 Katz et al. .................. 395/587
5,913,048 A * 6/1999 Cheong et al. .............. 395/391
6,247,118 B1 * 6/2001 Zumkehr et al. ........... 712/228

OTHER PUBLICATIONS

Implementing precise interrrupts in pipelined processors, Smith, J.E.; Pleszkun, A.R., Computers, IEEE Transactions on, vol.: 37 Issue: 5, May 1988 pp.: 562–573.*
Tamir, Y.; Tremblay, M.; Rennels, D.A., The implementation and application of micro rollback in fault–tolerant VLSI systems, Fault–Tolerant Computing, 1988. FTCS–18, Digest of Papers., Eighteenth International Symposium on, 1988 pp.: 234–239.*
Wang, C.–J.; Emnett, F., Area and performance comparison of pipelined RISC processors implementing different precise interrupt methods, Computers and Digital Techniques, IEEE Proceedings, vol.: 140 Issue: 4, Jul. 1993 pp.: 196–199.*

* cited by examiner

Primary Examiner—Eddie Chan
Assistant Examiner—Scott M. Collins
(74) Attorney, Agent, or Firm—Casimer K. Salys; Bracewell & Patterson, L.L.P.

(57) ABSTRACT

A pipelined processor and method are disclosed including an improved history file unit. The pipelined processor processes a plurality of instructions in order. A register file is included which includes a different read port coupled to each register field in an instruction buffer for reading data from the register file. A history file unit is included and is coupled to each of the read ports of the register file for receiving a copy of all data read from the register file.

13 Claims, 3 Drawing Sheets

PROCESSOR WITH IMPROVED HISTORY FILE MECHANISM FOR RESTORING PROCESSOR STATE AFTER AN EXCEPTION

BACKGROUND OF THE INVENTION

1. Field of the Invention

The present invention relates in general to pipelined microprocessor architecture and, in particular, to a pipelined microprocessor utilizing a history file mechanism to support speculative execution of instructions while maintaining a precise state.

2. Description of the Related Art

Microprocessors execute sequences of instructions. For many of these instructions, execution can be partitioned into an operation that produces the correct result in most cases while computing an exception condition that indicates the validity of the aforementioned result. Examples of such instructions include: (1) branch instructions, where branch prediction yields the "mostly correct" answer, and branch evaluation later computes the validity of the prediction, (2) load instructions, where a cache may provide data, and a memory management unit separately computes the validity of the data, and (3) arithmetic instructions, where an overflow condition maybe computed separately from the result. An instruction has "finished" executing when dependent instructions can proceed, whereas an instruction can be "committed" (or "completed") when it has finished and it, and all previous instructions, did not result in an exception condition.

Instruction set architectures (ISAs) tend to hide the exception conditions from the programmer, that is, the instruction definition either does not mention the exception cases, or requires a well-defined action. Hence, a branch is always expected to evaluate correctly, and a load instruction is expected to succeed, even if the data is not cached. An overflow condition may require the next instruction fetched to be a special one, such as a trap or handler.

Because the ISA hides the exceptions, processor designers generally have two choices: either fully resolve the instructions, including the exception cases, before scheduling the next instruction, or speculatively, without regard to exception conditions, execute instructions which requires including a mechanism for recovering the machine state for every instruction that has finished but not committed and that might except. If such a mechanism is present, the machine is said to support precise exceptions. Precise exceptions are exceptions where the cause of the exception is known and where the state of the processor when the exception occurred was saved.

Fundamentally, the state of the processor is lost when it is overwritten. To support precise exceptions, processor state should be lost only when it is overwritten by an instruction that has committed. A variety of mechanisms have been devised that achieve this. A reorder buffer buffers results of instructions that have finished, but not committed. Register renaming uses a larger set of physical registers and a variable mapping from architectural registers to physical registers. Mappings and their corresponding set of physical registers are conserved until overwritten by instructions that commit.

Another approach is a history file unit. This approach lets finishing instructions which have not committed overwrite the architectural values while keeping a copy of the old, overwritten values so that the prior state of the processor can be retrieved. When results are written to a register file, the old data of the registers is read and transferred to the history. When an exception occurs, data is transferred from the history file unit and restored to the register file in a last-in first-out manner. The history file unit has several disadvantages, however. For example, additional read ports are required on the register file to read the registers which are being overwritten. An additional disadvantage is that processor cycles are lost while prior values are restored on an exception.

Therefore a need exists for a pipelined processor utilizing an improved history file unit mechanism to support speculative execution of instructions while maintaining a precise state without adding additional read ports to a register file or devoting processor cycle solely to restoring old values on an exception.

SUMMARY OF THE INVENTION

A pipelined processor and method are disclosed including an improved history file unit. The pipelined processor processes a plurality of instructions in order. A register file is included which includes a different read port coupled to each register field in an instruction buffer for reading data from the register file. A history file unit is included and is coupled to each of the read ports of the register file for receiving a copy of all data read from the register file.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

Figure 1:
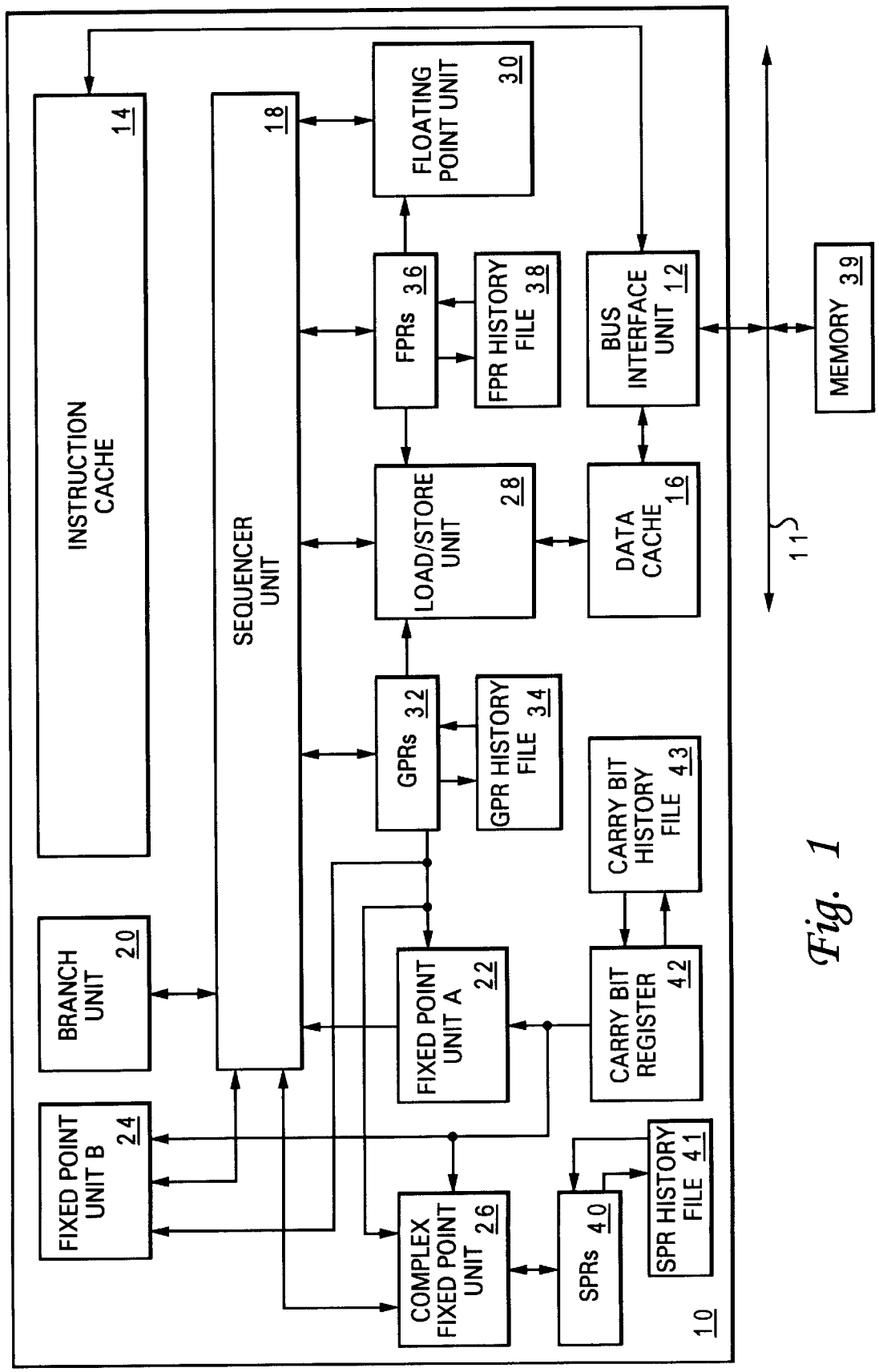
FIG. 1 illustrates a pictorial representation of a pipelined in-order processor in accordance with the method and system of the present invention.
Figure 2:
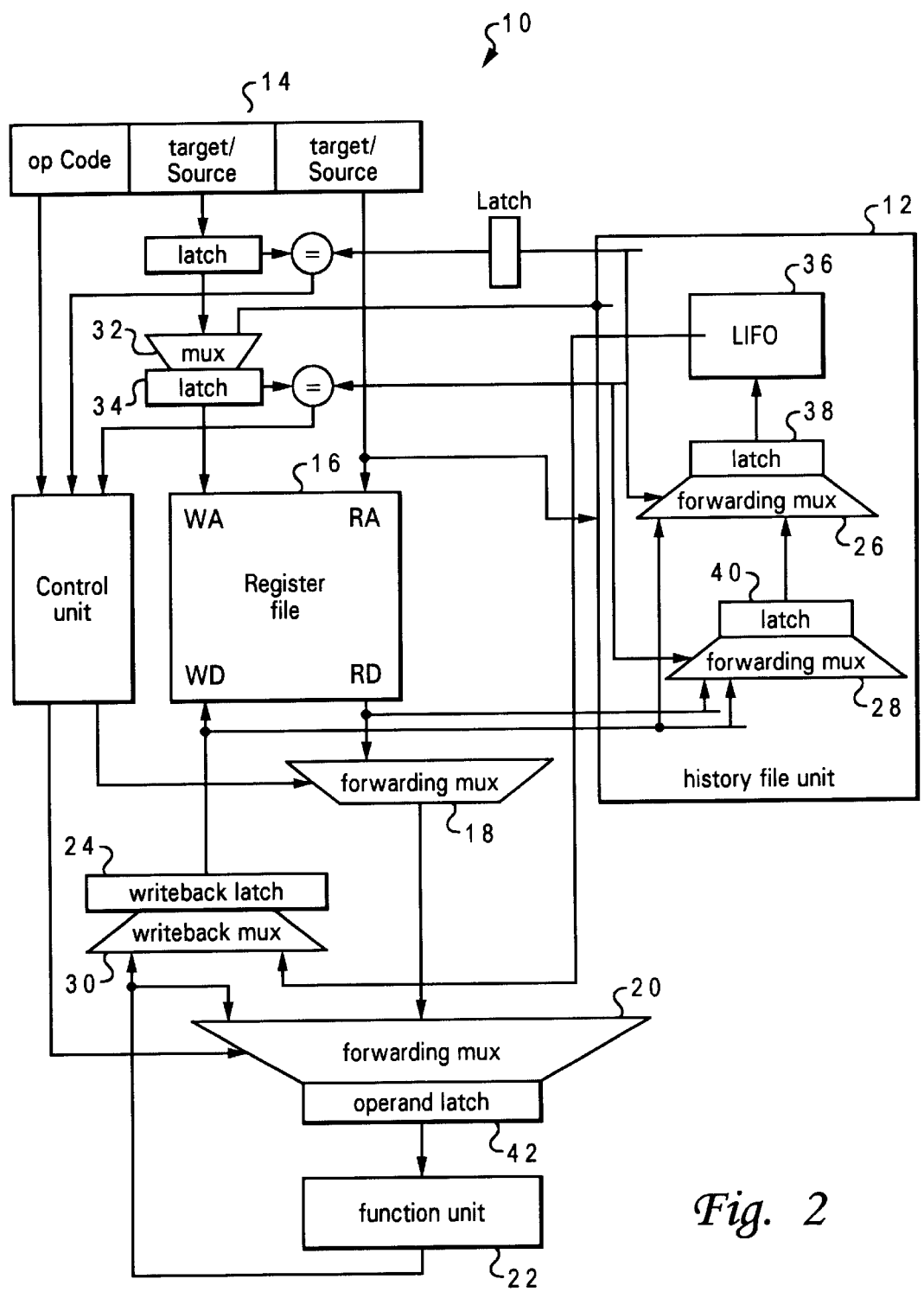
FIG. 2 depicts a more detailed pictorial representation of a processor including a history file unit in accordance with the method and system of the present invention.
Figure 3:
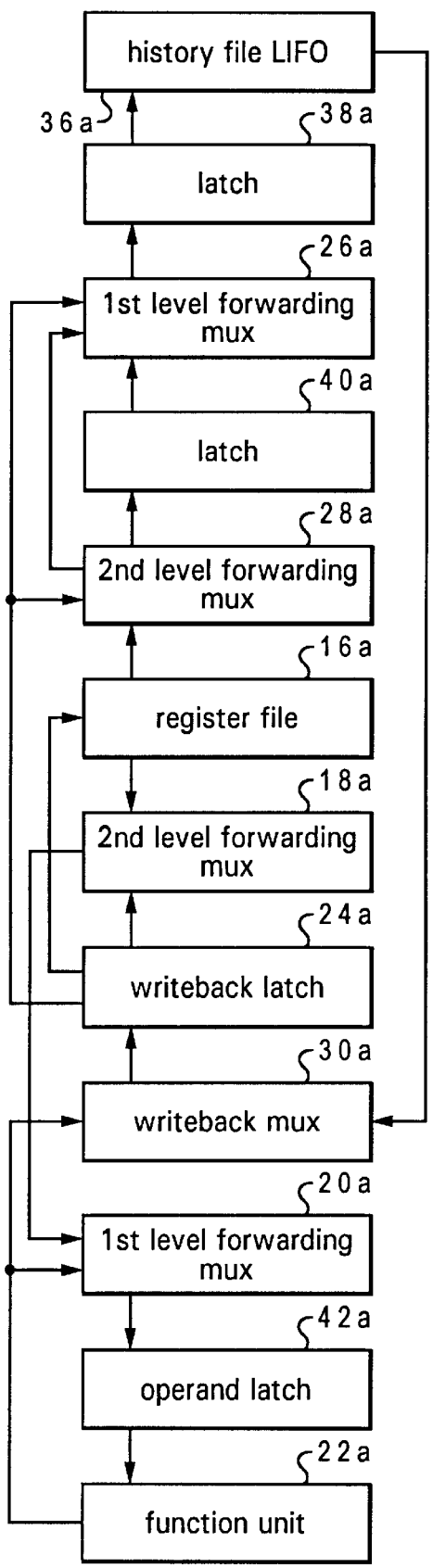
FIG. 3 illustrates a block diagram of a dataflow floorplan of the processor of FIG. 1 in accordance with the method and system of the present invention.

A preferred embodiment of the present invention and its advantages are better understood by referring to FIGS. 1–3 of the drawings, like numerals being used for like and corresponding parts of the accompanying drawings.

The present invention provides an improved history file unit. The improved history file unit reads old register values at instruction issue time, and requires no additional read ports. Results from prior instructions are forwarded to the history file unit in a manner similar to forwarding to operand latches. On exception conditions, including mispredicted branches, the state of the processor is restored while the next instruction is being fetched. No cycles are lost due to the restore mechanism. In the preferred embodiment, one level of forwarding in the history file unit is delayed by one cycle, so as not to penalize the register file and the function units.

In the prior art, register values were copied from the register file into the history file unit during the writeback stage. In the present invention, register values are copied from the register file into the history file unit during the instruction issue stage. Typically, register file values are read during the issuance of an instruction. In the present invention, when these values are read during issue, they are also copied into the history file unit. In RISC instruction sets such as PowerPC™ instruction set architecture, three register fields are specified in the instruction format. Since each of these fields may specify a source, at least three register read ports per instruction are required. According to the present invention, these read ports are operated both when the fields represent a source address and when the fields represent a target address. Therefore, additional read ports on the register file are not necessary.

Forwarding is needed in the history file unit because other instructions currently in flight may change the values of the registers which were read and stored in the history file unit.

FIG. 1 is a block diagram of a processor 10 system for processing information according to the preferred embodiment. In the preferred embodiment, processor 10 is a single integrated circuit microprocessor. Accordingly, as discussed further herein below, processor 10 includes various units, registers, buffers, memories, and other sections, all of which are formed by integrated circuitry. Also, in the preferred embodiment, processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs"). Ina preferred embodiment, the general purpose register may "forward" (or "bypass") results from other execution units without first storing them in registers. Moreover, FXUA 22 and FXUB 24 input a "carry bit" from a carry bit ("CA") register 42. FXUA 22, FXUB 24, CFXU 26 and LSU 28 output results (destination operand information) of their operations for storage to GPRs 32. Also, CFXU 26 inputs and outputs source operand information and destination operand information to and from special purpose registers ("SPRs") 40.

FPU 30 inputs its source operand information from floating point architectural registers ("FPRs") 36. In a preferred embodiment, the floating point architectural registers may "forward" (or "bypass") results from other execution units without first storing them in registers. FPU 30 outputs results (destination operand information) of its operation for storage to FPR 36.

In response to a Load instruction, LSU 28 inputs information from data cache 16 and copies such information to GPR 32. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16. According to the illustrative embodiment, each of the registers has an associated history file. Thus, SPR 40 has SPR history file 41, carry bit register 42 has carry bit history file 43, GPR 32 has GPR history file 34, and FPR 36 has FPR history file 38. The respective history files are referred to collectively by the description of the history file unit below, although the illustrative embodiment describes components and processes within GPR and FPR history files 34 and 38. 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the input of instructions from instruction cache 14, sequencer unit 18 selectively dispatches the instructions to selected ones of execution units 20, 22, 24, 26, 28, and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

As information is stored at a selected one of the GPRs, prior values in these registers are overwritten. However, because we allow instructions to write their results out of program order, and in a speculative manner (an exception condition may cause an instruction to "fault" after its results are written to the GPRs), the prior values of the registers must be read prior to being overwritten and the prior values maintained in a history file. According to this invention, these prior values are read during dispatch at the same time as the source operands.

Processor 10 achieves high performance by processing multiple instructions. simultaneously at various ones of execution units 20, 22, 24, 26, 28, and 30. Accordingly, each instruction is processed as a sequence of stages, each being executable in parallel with stages of other instructions. Such a technique is called "pipelining". In a significant aspect of the preferred embodiment, an instruction is normally processed as six stages, namely fetch, decode, dispatch, execute, writeback, and completion.

In the fetch stage, sequencer unit 18 selectively inputs (from instructions cache 14) one or more instructions from one or more memory addresses storing the sequence of instructions discussed further herein in connection with branch unit 20 and sequencer unit 18.

In the decode stage, sequencer unit 18 decodes fetched instructions.

In the dispatch and issue stage, sequencer unit 18 selectively dispatches decoded instructions to selected (in response to the decoding in the decode stage) ones of execution units 20, 22, 24, 26, 28, and 30 (destination operand information). In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage to GPRs 32, FPRs 36, SPRs 40, and carry bit register 42.

In the writeback stage, the output results from the different units are written to the appropriate registers. Because different instructions may require a different number of cycles to produce their results, writeback may occur "out of order" with respect to the programed instruction sequence.

The sequencer unit 18 accumulates information from the various execution units and determines if instructions have finished without exception conditions. If all instructions prior to and including the current instruction have "finished" without exception conditions, the prior architectural values of the registers overwritten by the current instruction need no longer be stored in the history files, and the instruction has "completed". Processor 10 thus "completes" instructions in order of their programmed sequence. If an exception condition does occur, the sequencing unit directs the GPRs, FPRs, SPRs, and carry bit store to restore architected values prior to the instruction causing the exception. The sequencing unit "refetches" instructions from the next valid instruction address.

FIG. 2 is a block diagram of a pipelined microprocessor 10 including an improved history file unit 12 in accordance with the method and system of the present invention.

History file unit 12 includes a last-in, first-out buffer 36, a first level forwarding multiplexer 26, latch 38, a second level forwarding multiplexer 28, and a latch 40.

Second level forwarding multiplexer 28 is coupled to the read data port and the write data ports of register file 16. Data received by forwarding multiplexer 28 is held in latch 40 and is then transferred to first level forwarding multiplexer 26 where the data is then held in latch 38. Data from latch 38 is then transferred to LIFO buffer 36 before being transferred to writeback multiplexer 30.

Instructions are issued from an instruction buffer 14. Source operands are retrieved from register file 16. A first level forwarding multiplexer 20 and associated operand latch 42 and a second level forwarding multiplexer 18 allow register file 16 to process writes before reads, and forward results of function unit 22 from the previous cycle. Results are restored to register file 16 from writeback latch 24.

Typically, fields in the instruction may specify either a target register or a source register. Therefore, all register fields in the instruction are typically read. Therefore, the values of the registers that an instruction will ultimately overwrite can be read at instruction issue time without adding any extra register read ports. The read operands and source address fields are passed to history file unit 12. However, in a pipelined processor, the value in these registers may be overwritten by instructions that were issued before the current instruction but have not yet finished.

The architectural values in history file unit 12 are constructed by the forwarding mechanism which is the same as that used to construct the architectural values in the operand latches. Two levels of forwarding, first level forwarding multiplexer 26 and second level forwarding multiplexer 28 are shown within history file unit 12.

A latch 40 is included in history file unit 12 between forwarding multiplexer 28 and forwarding multiplexer 26. Because latch 40 is included between the two forwarding multiplexers, the second level of forwarding in history file unit 12 is performed with a one-cycle delay with respect to the forwarding into the operand latches. Without latch 40, a long wire would have to be included from function unit 22 to forwarding multiplexer 26. Including latch 40 produces two advantages. First, function unit 22 result busses do not have to be extended to feed this extra set of forwarding multiplexers. And, second, no wiring tracks have to be devoted to such forwards, as shown in FIG. 3.

Data is provided from writeback latch 24 to the write data port of register file 16, forwarding multiplexer 18, forwarding multiplexer 26, and forwarding multiplexer 28.

When an exception occurs, multiplexer 30 on writeback latch 24 and multiplexer 32 on write address latch 34 select the overwritten values and register addresses provided by history file unit 12. Instructions that have not yet finished are simply ignored. Restore cycles can be overlapped with cycles needed to fetch the next valid instruction. In a typical organization, the refetch delay exceeds the restore delay, hence the restore cycles do not degrade the performance of the processor.

FIG. 3 is a block diagram of a dataflow floorplan of the processor of FIG. 1 in accordance with the method and system of the present invention. The components depicted in FIG. 3 are the functional equivalents of the elements depicted in FIG. 2, and are therefore, provided with similar base numbers (digits) extended by the letter "a". Thus, operand latch 42 of FIG. 2 is represented by operand latch 42a in FIG. 3, and so on. History file unit 12 is floorplanned away from function unit 22a, and does not add wiring delay to the forwarding paths. Also, no tracks have to be devoted to bringing the function results along with the outputs of the writeback latches to the forwarding multiplexers in history file unit 12. By duplicating the forwarding multiplexers on both the history file unit and function unit sides of register file 16a, a set of wiring tracks is saved and register file 16a access delay is improved.

Those skilled in the art will recognize that the invention may be implemented in superscalar machines with multiple instructions, multiple sources, multiple targets, and multiple function units.

While a preferred embodiment has been particularly shown and described, it will be understood by those skilled in the art that various changes in form and detail may be made therein without departing from the spirit and scope of the present invention.

What is claimed is:

1. A processor for processing a plurality of instructions, said processor comprising:
   a register file including a different read port coupled to each register field in an instruction buffer for reading data from said register file; and
   a history file unit coupled to each of said read ports of said register file for receiving a copy of all data read from said register file, wherein said history file comprises:
   a first level forwarding multiplexer and a second level forwarding multiplexer for forwarding data to a file storage unit; and a latch coupled between said first level forwarding multiplexer and said second level forwarding multiplexer, wherein said latch receives as its input an output of said first level forwarding multiplexer, and said latch provides an output that is received as an input to said second level forwarding multiplexer.

2. The processor of claim 1, further comprising:

at least one function unit; and a writeback multiplexer that receives as its inputs an output of said history file unit and an output of said function unit, said writeback multiplexer selecting between said output of said history file unit and said output of said function unit as the output of said writeback multiplexer.

3. The processor of claim 2, further comprising:

a writeback latch that receives as its input an output of the writeback multiplexer, wherein said writeback latch generates an output that is written to said register file; and wherein said history file unit receives a copy of said output of said writeback latch as it is written to said register file.

4. The processor of claim 2, further comprising logic for determining a selection by said MUX of either data from said function unit or from said history file unit, wherein said logic automatically selects data from said history file unit when an exception occurs.

5. The processor of claim 1, further comprising a writeback latch being coupled to said first level forwarding multiplexer and said second level forwarding multiplexer, wherein said writeback latch receives as its input an output of a writeback multiplexer.

6. The processor of claim 1, wherein said processor completes processing of instructions in a pipelined manner.

7. The processor of claim 1, further comprising a second forwarding latch coupled between said second level forwarding multiplexer and said storage unit, wherein said latch delays transmission of an input data to said storage unit by one clock cycle.

8. The processor of claim 1, further comprising logic that, responsive to an occurrence of an exception:

determines which instructions have not completed;

triggers the restoring of data from said storage unit into said register file; and concurrently with said restoring of said data, initiates a re-fetch of instructions for subsequent execution.

9. The processor of claim 8, wherein said storage unit is a last-in first-out register that returns data during the restoring process in the reverse order in which the data were placed within the storage unit.

10. A method in a pipelined processor for providing an efficient response to an exception, said method comprising:

reading data stored in a register file at the time an instruction is being stored in an instruction buffer, said register file including a different read port coupled to each register field in said instruction buffer;

storing said data in a storage unit of a history file unit that is coupled to each of said read ports of said register file, wherein said history file unit comprises:

said storage unit;

a first level forwarding multiplexer and a second level forwarding multiplexer for forwarding data to a file storage unit; and a latch coupled between said first level forwarding multiplexer and said second level forwarding multiplexer, wherein said latch receives as its input an output of said first level forwarding multiplexer, and said latch provides an output that is received as an input to said second level forwarding multiplexer; and when an exception occurs within the processor, forwarding said data stored in said storage unit of said history file to said register file.

11. The method according to claim 10, further comprising the steps of:

executing said instruction stored in said instruction buffer;

overwriting data stored in said register file associated with a register included in said instruction with new data; and forwarding a copy of said new data to said history file unit in response to a determination that said new data represents an architectural state of said register.

12. The method according to claim 11, wherein said forwarding step includes the step of restoring data from said history file unit to said register file in response to an exception condition so that a previous state of said processor is restored.

13. The method according to claim 12, further comprising the step of restoring said previous state of said processor concurrently with fetching a next instruction to be processed after said instruction which caused said exception condition.

* * * * *

UNITED STATES PATENT AND TRADEMARK OFFICE
CERTIFICATE OF CORRECTION

PATENT NO. : 6,587,941 B1
DATED : July 1, 2003
INVENTOR(S) : Brian K. Flachs et al.

It is certified that error appears in the above-identified patent and that said Letters Patent is hereby corrected as shown below:

Title page,
Item [12], delete "Flacks" and insert -- Flachs --.
Item [75], Inventors, delete "Flacks" and insert -- Flachs --.

Column 4,
Line 13, delete "16, then data cache 16 inputs (through BIU 12 and system bus 11) such information from a system memory 39 connected to system bus 11. Moreover, data cache 16 is able to output (through BUI 12 and system bus 11) information from data cache 16 to system memory 39 connected to system bus 11. In response to a Store instruction, LSU 28 inputs information from a selected one of GPRs 32 and FPRs 36 and copies such information to data cache 16."
Line 58, delete "."

Signed and Sealed this

Twenty-seventh Day of January, 2004

JON W. DUDAS
*Acting Director of the United States Patent and Trademark Office*